(12) United States Patent
Abedini et al.

(10) Patent No.: US 11,895,697 B2
(45) Date of Patent: Feb. 6, 2024

(54) INTEGRATED ACCESS AND BACKHAUL NETWORK RANDOM ACCESS PARAMETER OPTIMIZATION

(71) Applicant: QUALCOMM Incorporated, San Diego, CA (US)

(72) Inventors: Navid Abedini, Somerset, NJ (US); Tao Luo, San Diego, CA (US); Jianghong Luo, Skillman, NJ (US); Luca Blessent, Whitehouse Station, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 17/021,252

(22) Filed: Sep. 15, 2020

(65) Prior Publication Data
US 2021/0092764 A1 Mar. 25, 2021

Related U.S. Application Data

(60) Provisional application No. 62/903,456, filed on Sep. 20, 2019.

(51) Int. Cl.
*H04W 74/00* (2009.01)
*H04W 74/08* (2009.01)
*H04W 16/32* (2009.01)
*H04W 88/08* (2009.01)

(52) U.S. Cl.
CPC ......... *H04W 74/008* (2013.01); *H04W 16/32* (2013.01); *H04W 74/0833* (2013.01); *H04W 88/085* (2013.01)

(58) Field of Classification Search
CPC . H04W 16/32; H04W 52/243; H04W 52/365; H04W 52/50; H04W 74/008; H04W 74/08; H04W 74/0833; H04W 88/085; H04B 7/15528
See application file for complete search history.

(56) References Cited

U.S. PATENT DOCUMENTS

| 9,820,159 B2 | 11/2017 | Ghasemzadeh et al. |
| 10,980,082 B2 * | 4/2021 | Fiorani ................... H04L 69/24 |
| 2020/0404518 A1 * | 12/2020 | Yuan ...................... H04W 24/02 |
| 2021/0051579 A1 * | 2/2021 | Luo ........................ H04W 76/27 |

(Continued)

FOREIGN PATENT DOCUMENTS

WO 2019170087 A1 9/2019

OTHER PUBLICATIONS

International Search Report and Written Opinion—PCT/US2020/051059—ISA/EPO—dated Nov. 16, 2020.

(Continued)

*Primary Examiner* — Liton Miah
(74) *Attorney, Agent, or Firm* — QUALCOMM INCORPORATED

(57) ABSTRACT

An apparatus acquires random access information for at least one of a donor node serving the node or a neighbor cell of the node and determines one or more random access parameters for a device to perform a random procedure with the node. The one or more random access parameters are based on the acquired random access information. The apparatus may be an IAB node.

56 Claims, 14 Drawing Sheets

(56) References Cited

U.S. PATENT DOCUMENTS

2021/0219340 A1* 7/2021 Shi ..................... H04W 74/085
2022/0141910 A1* 5/2022 Muhammad ............ H04L 45/28
370/329

OTHER PUBLICATIONS

Qualcomm Inc, et al., "IAB Inter-CU Topology Adaptation for Arch 1a", 3GPP TSG-RAN WG3 Meeting #102, 3GPP Draft, R3-186456, Inter-CU Topology Adaptation for Arch11, 3rdGeneration Partnership Project (3GPP), Mobile Competence Centre, 650, Route DesLucioles, F-06921 Sophia-Antipolis Cedex, France, vol. RAN WG3. No. Spokane, WA. USA, Nov. 12, 2018-Nov. 16, 2018, Nov. 2, 2018 (Nov. 2, 2018), 9 Pages, XP051482600, Retrieved from the Internet: URL: http://www.3gpp.org/ftp/tsg_ran/WG3_iu/TSGR3_102/Docs/R3-186456.zip.

* cited by examiner

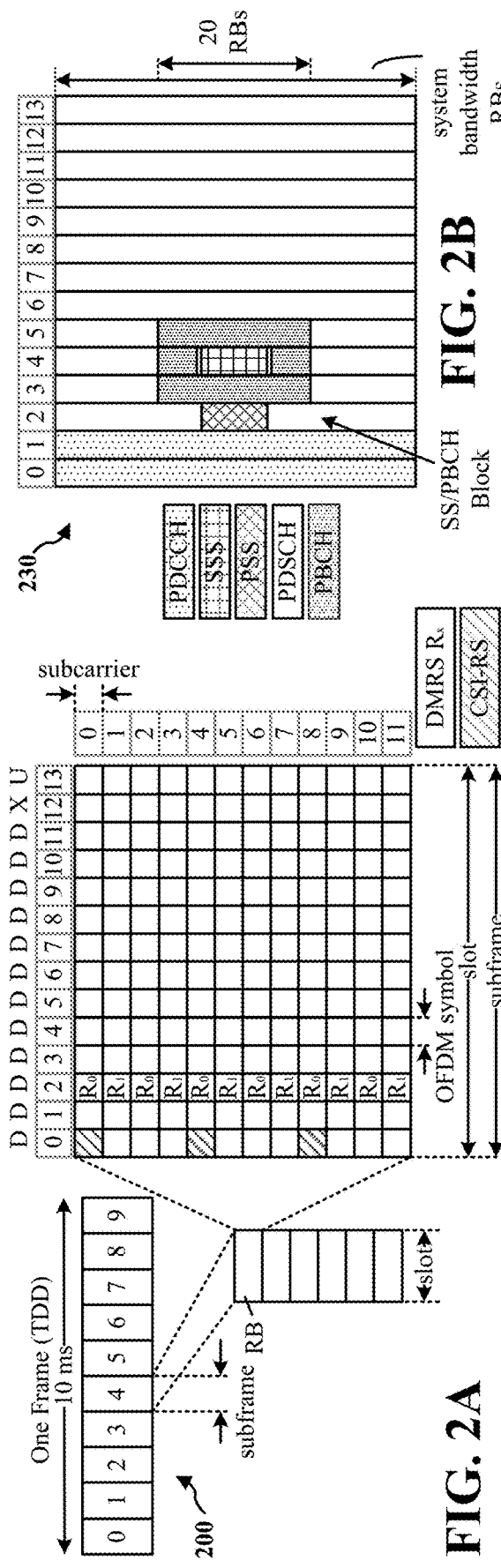
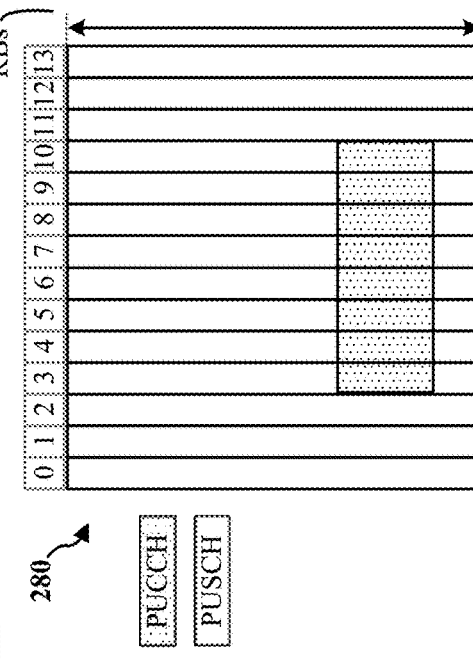
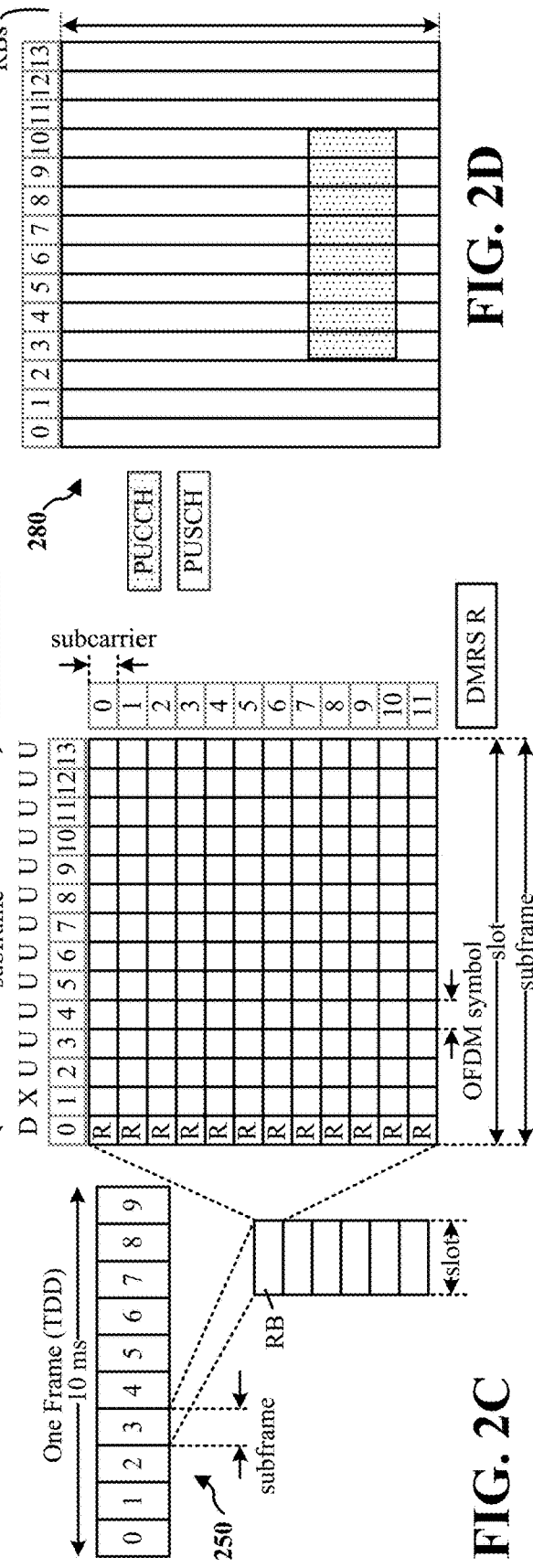
FIG. 2A  FIG. 2B  FIG. 2C  FIG. 2D

INTEGRATED ACCESS AND BACKHAUL NETWORK RANDOM ACCESS PARAMETER OPTIMIZATION

CROSS REFERENCE TO RELATED APPLICATION(S)

This application claims the benefit of U.S. Provisional Application Ser. No. 62/903,456, entitled "INTEGRATED ACCESS AND BACKHAUL NETWORK RANDOM ACCESS PARAMETER OPTIMIZATION" and filed on Sep. 20, 2019, which is expressly incorporated by reference herein in its entirety.

BACKGROUND

Technical Field

The present disclosure relates generally to communication systems, and more particularly, to integrated access and backhaul (IAB) networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Integrated access and backhaul (IAB) networks may include multiple cells in communication with each other to provide an access network and a backhaul network to a core network. Each node in the IAB network may have a random access configuration including random access parameters for a user equipment (UE) to use during a random access procedure with the IAB node. The nodes of the IAB network may be numerous and may be close together, making network planning for the random access configuration and/or the random access parameters difficult or impractical.

An IAB node acquires random access information for at least one of a donor node serving the node or a neighbor cell of the node and determines one or more random access parameters for a device to perform a random procedure with the node. The random access information for the serving node or the neighbor cell may be the random access configuration of the serving node or neighbor cell. The one or more random access parameters are based on the acquired random access information. The IAB node may reconfigure its random access configuration to include the determined random access parameter. The IAB node may determine the random access parameter by examining the random access configuration received from the serving node or neighbor cell. Additionally or alternatively, the IAB node may send the random access configuration received from a neighbor cell to the serving node and determine the random access parameter based on a random access parameter received from the serving node in response.

In an aspect of the disclosure, a method, a computer-readable medium, and an apparatus are provided. The apparatus acquires, at a mobile termination (MT) of a node, random access information for at least one of a donor node serving the node or a neighbor cell of the node. The apparatus determines one or more random access parameters for a device to perform a random procedure with the node, wherein the one or more random access parameters are based on the acquired random access information.

In an aspect of the disclosure, a method, a computer-readable medium, and an apparatus are provided. The apparatus receives a report, from a node served by a central unit (CU), including random access information acquired by the node for at least one of a donor node serving the node or a neighbor cell of the node. The apparatus determines one or more random access parameters for a device to perform a random procedure with the node, wherein the one or more random access parameters are determined based on the acquired random access information. The apparatus sends the one or more random access parameters to the node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
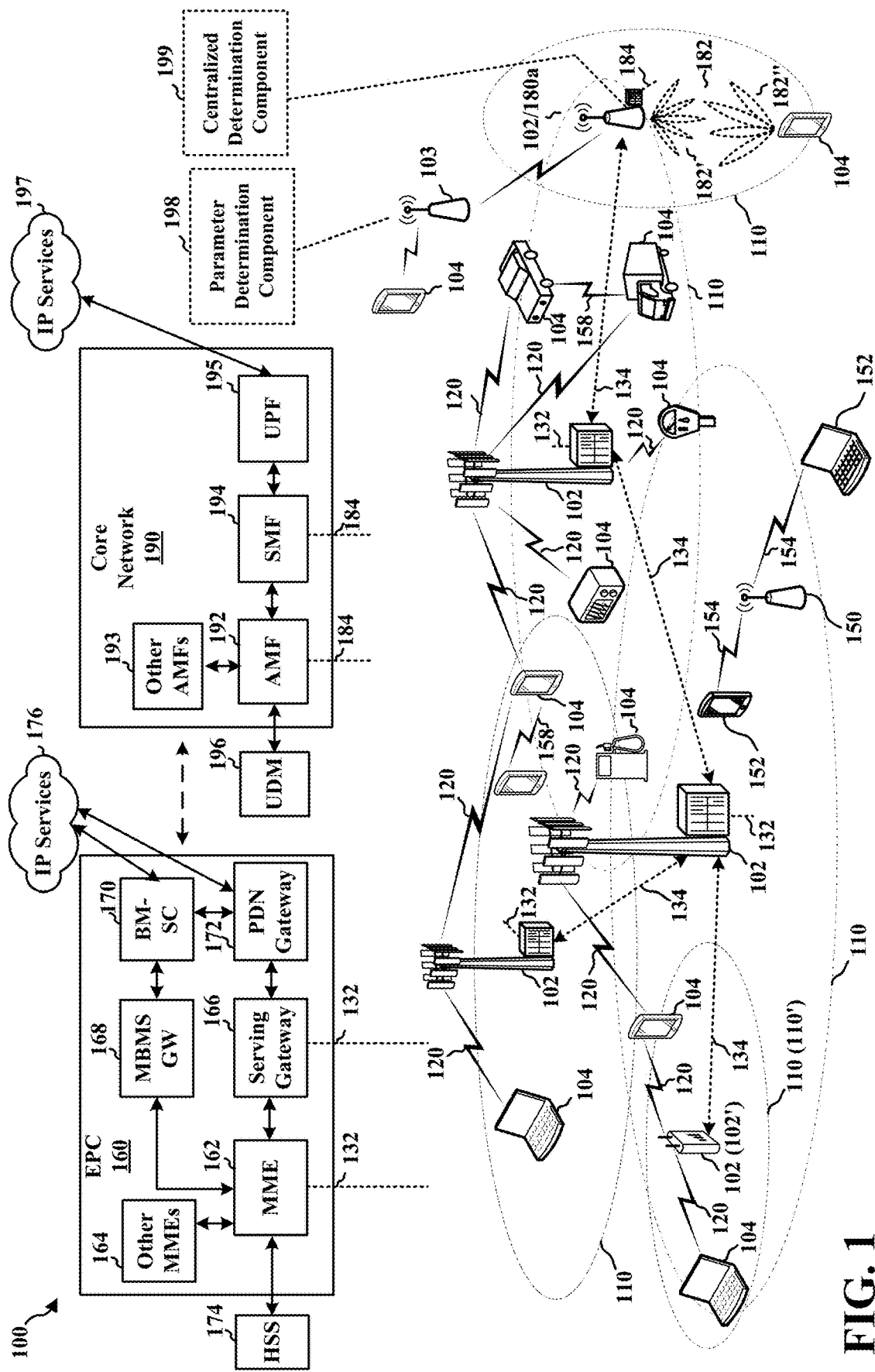
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the wireless communications system and an access network 100 may include an IAB network, for example, including the IAB node 103. A base station 102/180 communicating with the IAB node 103 may be or comprise a control node or an IAB donor node 180a. In some aspects, the IAB node 103 may be configured to determine a parameter for a UE 104 to perform a random access procedure with the IAB node 103. The IAB node 103 may include a parameter determination component 198 configured to determine the parameter based on system information received from a neighboring node or a message from the IAB donor 180a. The IAB donor 180a may include a centralized determination component 198 configured to determine a value for the parameter, e.g., based on the system information received by the IAB node 103. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
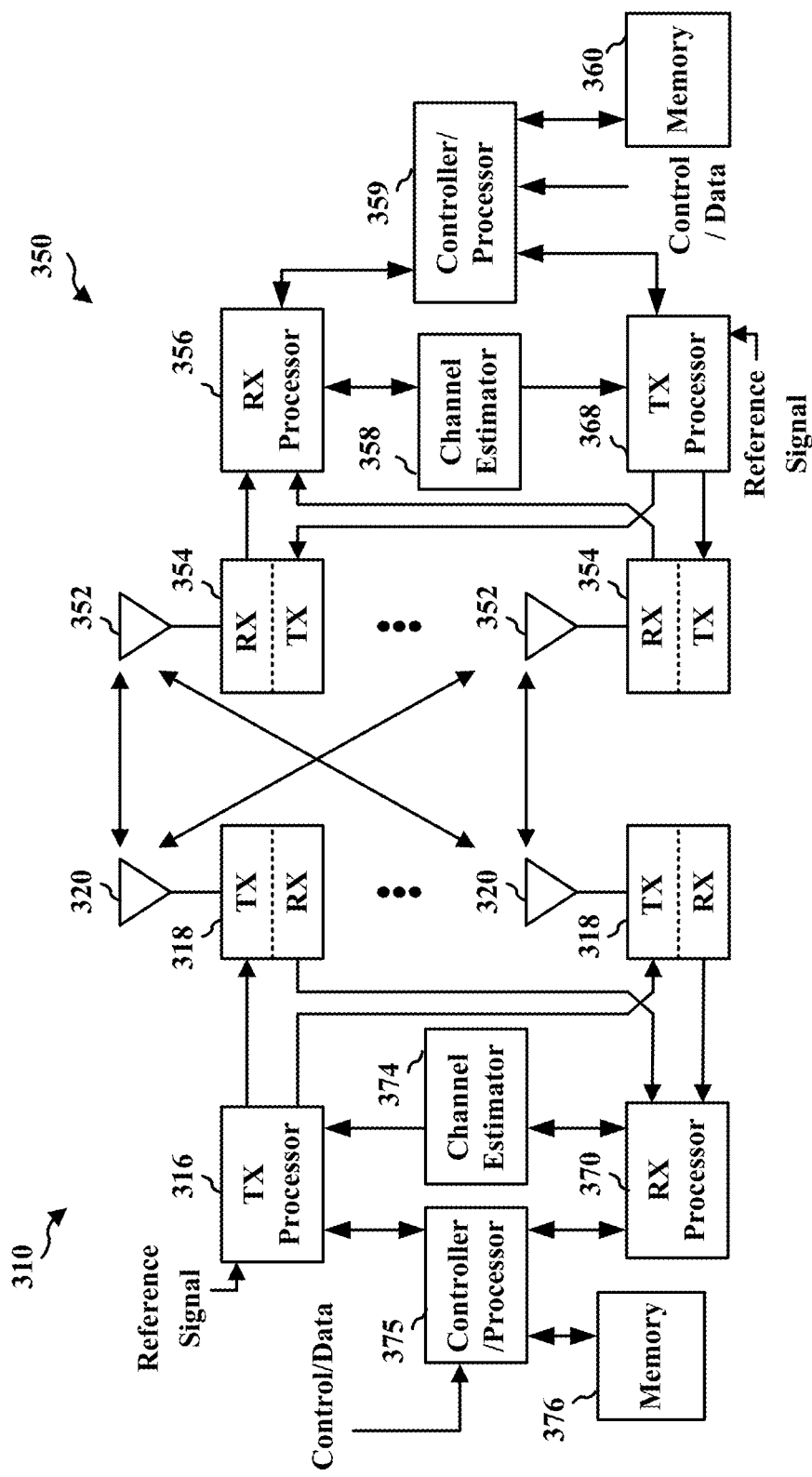
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer ofupper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

Figure 4:
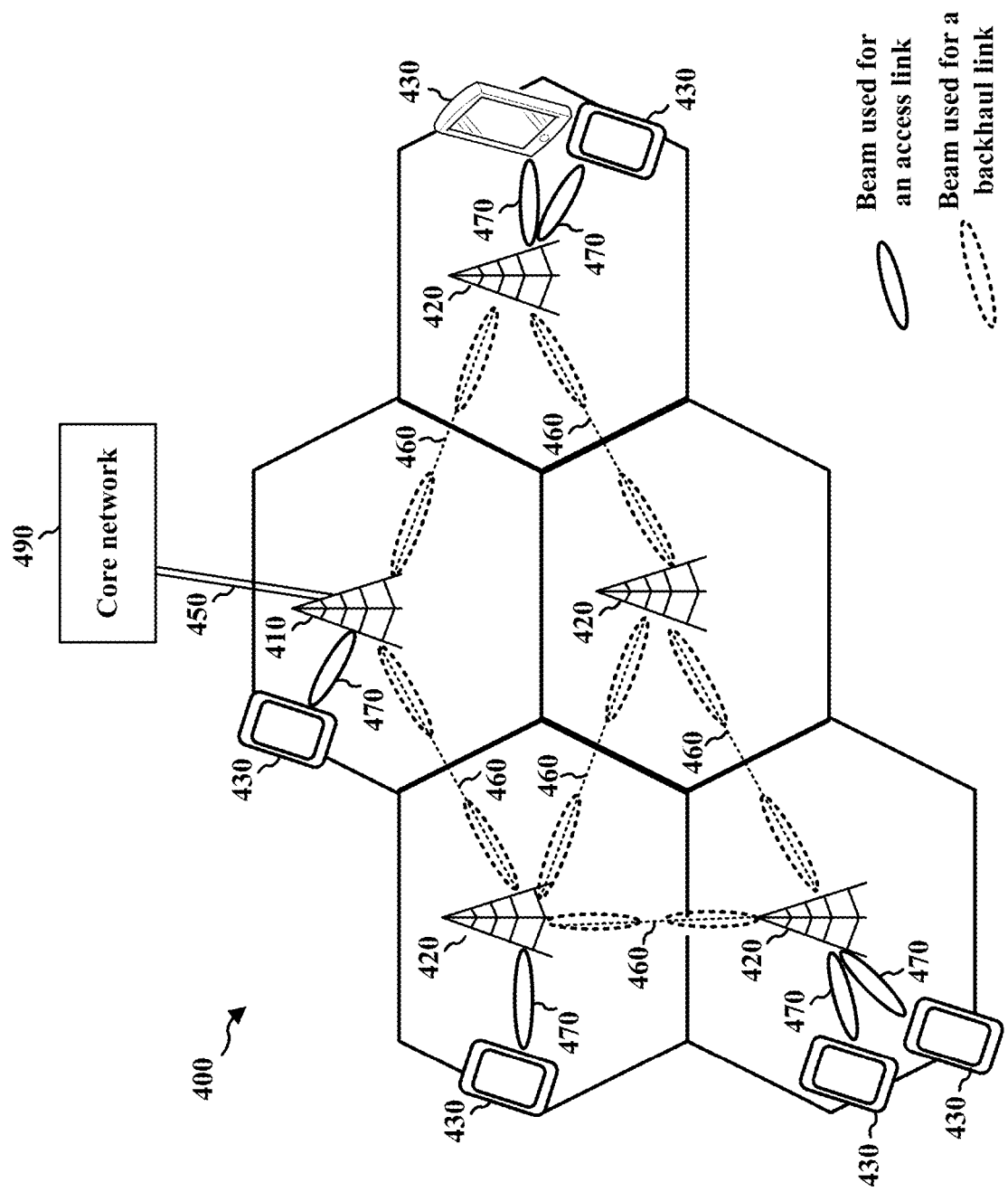
FIG. 4 is a diagram illustrating an IAB network.

FIG. 4 is a diagram illustrating an IAB network 400. The IAB network 400 may include an anchor node or a control node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Figure 5:
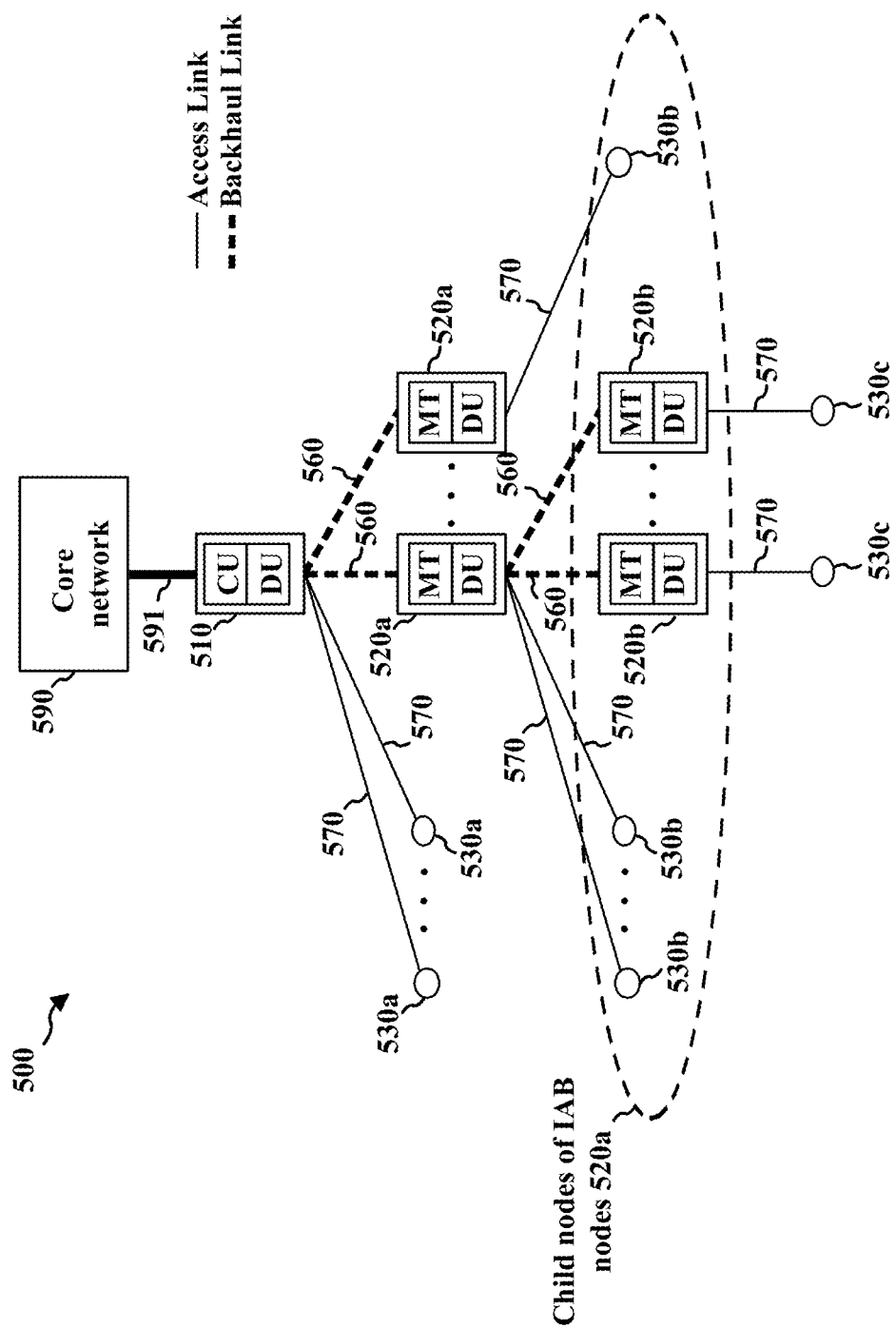
FIG. 5 is a diagram illustrating an IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of an IAB node 520a may operate as a scheduled node, scheduled similar to a UE 530a by the DU of the parent node, e.g., IAB donor 510. The MT of an IAB node 520b may operate as a scheduled node of parent IAB node 520a. The DU of an IAB node 520a may schedule the child IAB nodes 520b and UEs 530b of the IAB node 520a. As an IAB node may provide a connection to an IAB node that in turn provides a connection for another IAB node, the pattern of a parent IAB node comprising a DU that schedules a child IAB node/child UE may continue.

Figure 6:
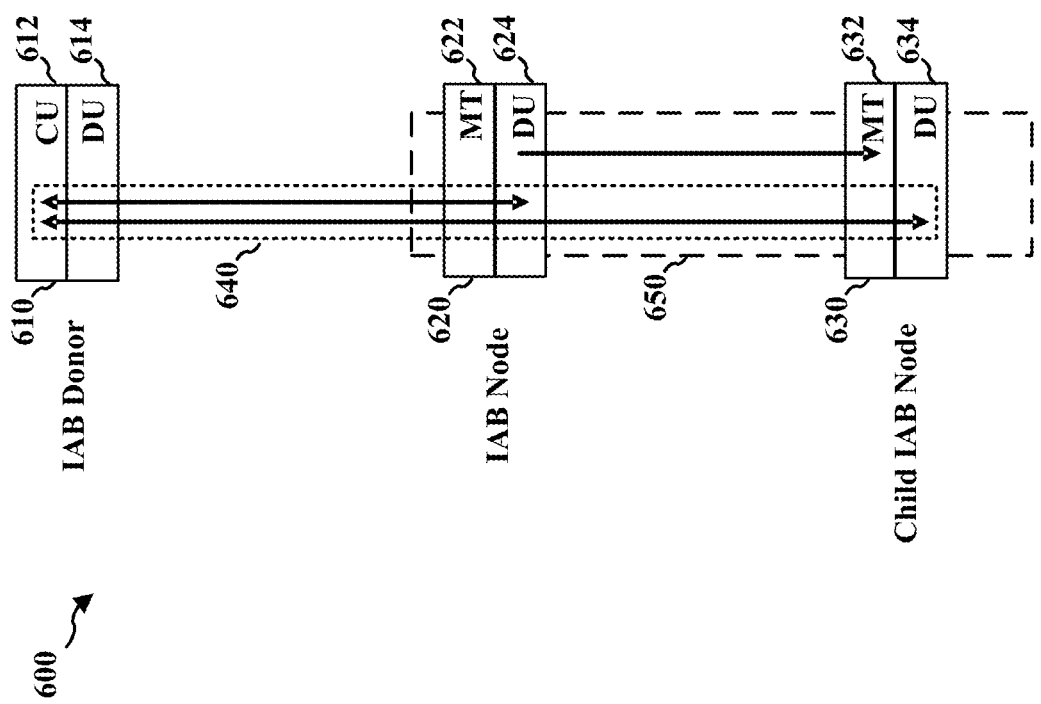
FIG. 6 illustrates examples of interaction between an IAB donor, an IAB node, and a child IAB node.

FIG. 6 illustrates examples of interaction between an IAB donor 610, an IAB node 620, and a child IAB node 630. The CU 612 of the IAB donor 610 may provide centralized management of the resources available for communication of the IAB nodes. The CU 612 of the IAB donor 610 may allocate the resources semi-statically. Additionally or alternatively, the soft resources of a child node may be controlled in a distributed dynamic fashion by the parent of the child node (e.g., the DU 624 or 614 of the parent node). For example, the DU 624 of the IAB node 620 may allocate the soft resources of the child IAB node 630 through dynamic control signaling.

The MTs 622 and 632 may have resources that are downlink (DL) resources, uplink (UL) resources, or flexible (F) resources. The DUs 614, 624, and 634 may have hard DL resources, hard UL resources, and/or hard F resources. The DUs 614, 624, and 634 may have soft DL resources, soft UL resources, and/or soft flexible resources. In addition to hard or soft resources types, the DUs 614, 624, and 634 may have resources that are not available (NA) type resources.

The CU 612 of the IAB donor 610 may communicate with the DU 624 of the IAB node 620 and the DU 634 of the child IAB node 630 over an F1-AP interface 640. The F1-AP interface 640 may support exchanging information (e.g., TDD-UL-DL configuration) and transferring encapsulated RRC messages for the MT of a child of the receiving IAB node (e.g., transferring an encapsulated RRC message for the child IAB node 630 to the DU 624 of the IAB node 620). In some aspects, the CU 612 may configure the resource pattern of the DU 624 of the IAB node 620 over the F1-AP interface 640.

The DU 624 of the IAB node 620 may communicate with the MT 632 of the child IAB node 630 over a Uu air interface 650. The Uu air interface 650 may support transferring RRC messages received from the CU 612 of the IAB donor 610 to the MT 632 of the child IAB node 630, and may support the DU 624 of the IAB node 620 dynamically scheduling the MT 632 of the child IAB node 630. In some aspects, the IAB node 620 may dynamically control the soft resources of the DU 634 of the child IAB node 630 over the Uu air interface 650.

Figure 7:
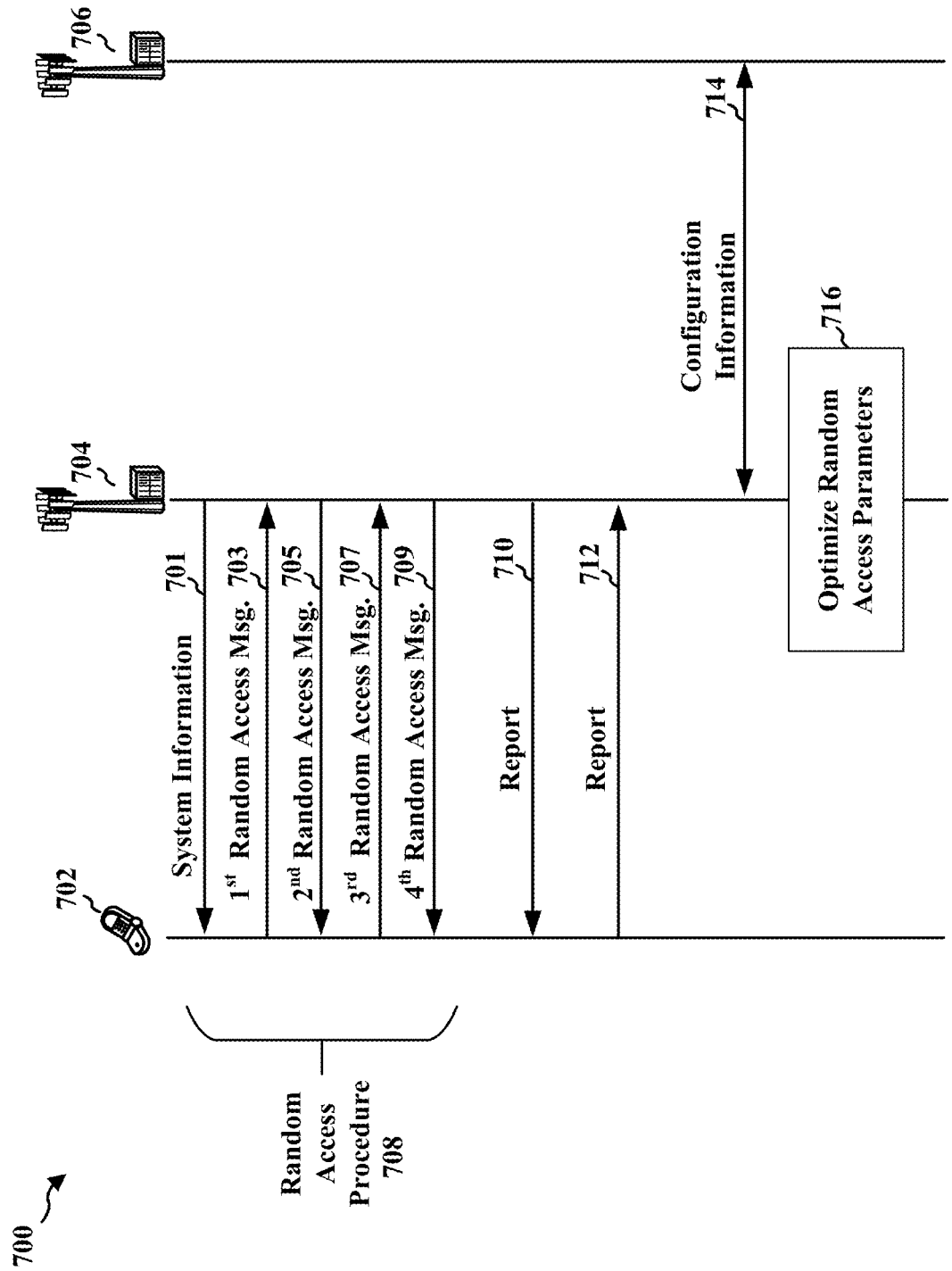
FIG. 7 is a communication diagram illustrating RACH optimization communication between at UE, a base station, and another base station.

FIG. 7 is a communication diagram illustrating RACH optimization communication between at UE 702, a base station 704, and another base station 706.

When a UE 702 initially attempts to connect to a mobile network, the UE may perform a random access procedure 708 to establish communication with nodes of the network. The random access procedure 708 may be referred to as a random access channel (RACH) procedure. For example, the UE may use the random access procedure 708 to request an RRC connection, to re-establish an RRC connection, resume an RRC connection, etc. The UE 702 may initiate the random access message exchange by sending, to the base station 704, a first random access message 703 (e.g., Msg 1) including a preamble. The UE 702 may obtain random access parameters, e.g., including preamble format parameters, time and frequency resources, parameters for determining root sequences and/or cyclic shifts for a random access preamble, etc., e.g., in system information 701 from the base station 704. The preamble in the first random access message 703 may be transmitted with an identifier, such as a Random Access RNTI (RA-RNTI). The UE 702 may randomly select a random access preamble sequence, e.g., from a set of preamble sequences. If the UE 702 randomly selects the preamble sequence, the base station 704 may receive another preamble from a different UE at the same time. In some examples, a preamble sequence may be assigned to the UE 702.

The base station 704 may respond to the first random access message 703 by sending a second random access message 705 (e.g. Msg 2) using PDSCH and including a random access response (RAR). The RAR may include, e.g., an identifier of the random access preamble sent by the UE 702, a time advance (TA), an uplink grant for the UE 702 to transmit data, a cell radio network temporary identifier (C-RNTI) or other identifier, and/or a back-off indicator. Upon receiving the second random access message 705 including the RAR, the UE 702 may transmit a third random access message 707 (e.g., Msg 3) to the base station 704, e.g., using PUSCH, that may include a RRC connection request, an RRC connection re-establishment request, or an RRC connection resume request, depending on the trigger initiating the random access procedure 708. The base station 704 may then complete the random access procedure 708 by sending a fourth random access message 709 (e.g., Msg 4) to the UE 702, e.g., using PDCCH for scheduling and PDSCH for the message. The fourth random access message 709 may include a random access response message that includes timing advancement information, contention resolution information, and/or RRC connection setup information. The UE 702 may monitor for PDCCH, e.g., with the C-RNTI. If the PDCCH is successfully decoded, the UE 702 may also decode the PDSCH. The UE 702 may send HARQ feedback for any data carried in the fourth random access message. If two UEs sent a same preamble in their respective first random access messages 703, both UEs may receive the RAR leading both UEs to send a third random access message 707. The base station 704 may resolve such a collision by being able to decode the third random access message 707 from only one of the UEs and responding with a fourth random access message 709 to that UE. The other UE, which did not receive the fourth random access message 709, may determine that random access did not succeed and may re-attempt random access. Thus, the fourth message 709 may be referred to as a contention resolution message. The fourth random access message 709 may complete the random access procedure 708. Thus, the UE 702 may then transmit uplink communication and/or receive downlink communication with the base station 704 based on the RAR of the fourth random access message 709.

In some aspects, random access parameters for a cell may be adjusted to improve access probability or to reduce latency associated with random access. A base station may configure random access parameters for the random access process or may adjust the random access parameters based on varying conditions as communication within a network changes. For example, the random access parameters may be configured or reconfigured to optimize random access with a base station. An optimized random access configuration may enable improved communication with a UE and network performance gains through a reduced connection time, a higher throughput, or a better cell coverage. The random access parameters may include the number and location of random access resources, such as time and frequency resources and/or preamble resources for random access. For example, a random access configuration of the base station may indicate a number of random access occasions (ROs) and/or locations of the ROs in time and frequency. The random access parameters may include a back-off parameter that may be used to avoid congestion. The back-off parameter may be a timer value, and the base station may resolve contention between UEs trying to connect to the base station by instructing one or both UEs to back off after the timer value has expired. The random access parameters may also include power-related parameters. The power-related parameters may include the initial transmission power for transmitting random access messages, the initial target reception power, and/or power ramp steps. Random access messages may include an identifier, such as a preamble. To avoid collision between different base stations using the same identifier (e.g., between a macro cell and a small cell), a base station may be assigned, or may use, a subset of available identifiers. The random access parameters may include the subset of available identifiers for that base station.

The base station 704 may send a report 710 (such as a RACH-reportReq-r9) to the UE 702. The UE 702 may receive the report 710 and may send a report 712 (e.g., a RACH report) to the base station 704. The report 712 from the UE may provide data regarding the random access procedure 708 performed between the UE 702 and the base station 704. For example, the report 712 may indicate the number of attempts the UE 702 made before the random access procedure 708 was successfully performed and a connection was established with the base station 704. The report 712 may indicate whether the UE 702 experienced contention with another UE when attempting to establish the connection with the base station 704.

At 714, the base station 704 may receive information about the random access configuration of another base station 706, including the values of some or all of the random access parameters of the other base station 706, from the other base station 706. The base station 704 may also send information about its random access configuration, including the values of some or all of the random access parameters of the base station 704, to the other base station 706. The base station 704 and the other base station 706 may exchange information about their random access configurations over the X2 interface.

As illustrated at 716, the base station 704 may optimize its random access parameters, e.g., adjust its random access parameters to improve the probability and latency of a UE accessing the network. The base station 704 may optimize its random access parameters based on information received in reports including the report 712 received from the UE 702. The base station 704 may additionally or alternatively optimize its random access parameters based on the information about the random access configuration of the other base station 706. For example, the base station 704 may change the subset of available identifiers for random access preambles (e.g., may request a new subset from a controlling entity) based on determining that its current identifiers overlap with the identifiers used by the other base station 706.

Figure 8:
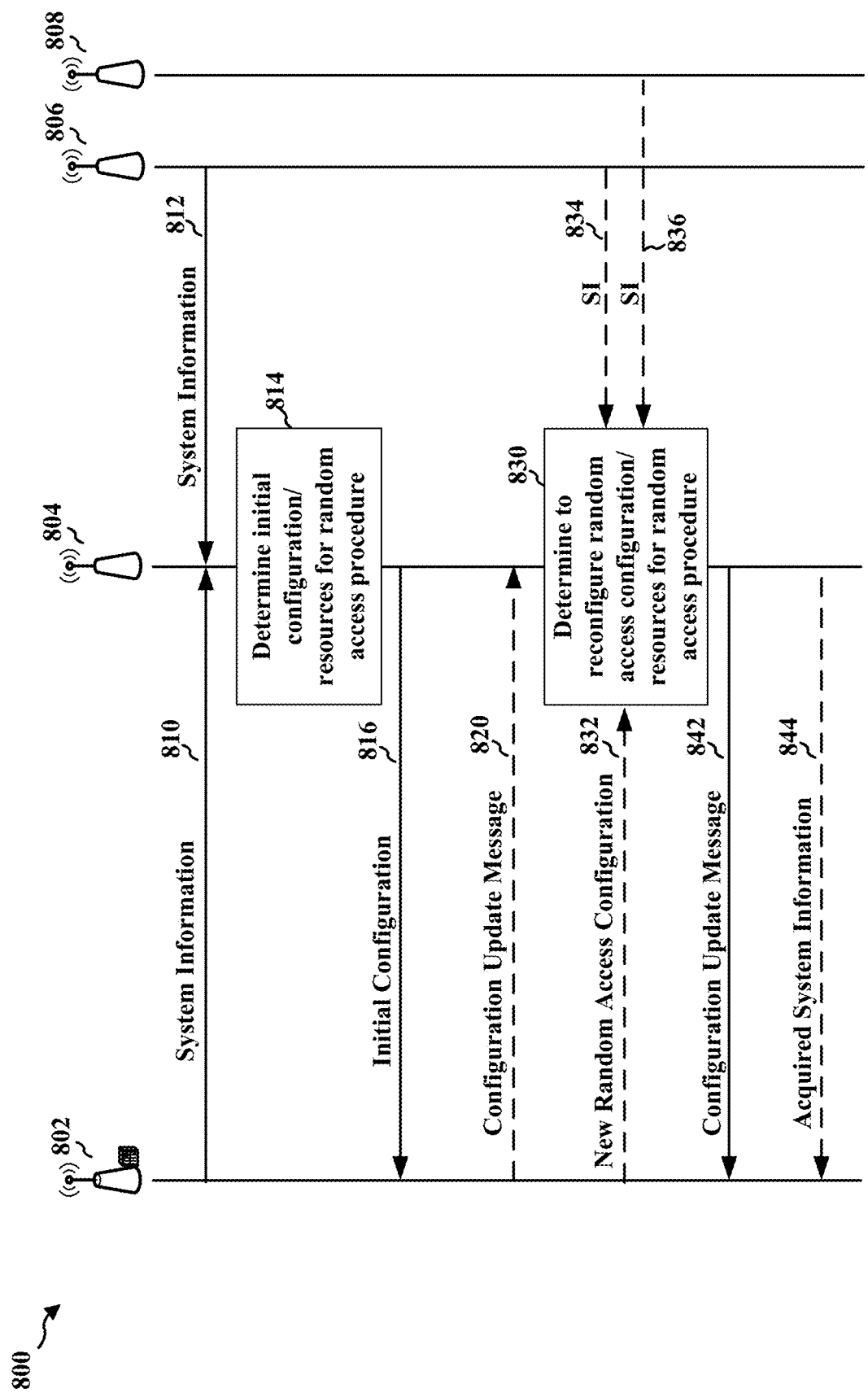
FIG. 8 is a communication diagram illustrating random access procedure communication in an IAB network.

FIG. 8 is a communication diagram illustrating random access procedure communication in an IAB network. The IAB network may include an IAB donor 802 and IAB nodes 804, 806, and 808. An IAB network may include multiple nodes with overlap and/or in relatively close proximity, and in some aspects may include mobile IAB nodes. Accordingly, manual and/or static network planning to avoid interference, collisions, etc., may be impractical or impossible.

In some aspects, a DU of an IAB node may determine its initial configuration/resources for random access. The IAB node may be preconfigured with a certain random access configuration and/or random access resources. Therefore, the DU may use the preconfigured random access configuration and/or random access resources for the initial random access configuration and/or random access resources. Such baseline random access configuration parameter(s) or resources may be preconfigured by a CU, preconfigured by a manufacturer, or based on predefined parameters that are applied by DUs in general. An initial configuration may be provided for mobile IAB nodes. As presented herein, the DU of the IAB node may acquire information about the IAB network it is joining and may determine initial random access configuration parameters or resources based on the acquired information. This may enable the IAB node to optimize the initial random access configuration or resources for the IAB network of which it will be a part.

For example, an IAB node 804 may acquire system information 810 from the IAB donor 802. The IAB node 804 may additionally or alternatively acquire system information 812 from another IAB node 806. The IAB node 806 may be a neighbor IAB node (e.g., may be within a set distance from the IAB node 804, or may be a parent or a child of the IAB node 804). Specifically, the MT of the IAB node 804 may acquire the system information 810 and/or 812. In some aspects, the system information may indicate the random access configurations of the respective IAB node, e.g., IAB donor 802 or the IAB node 806. In some aspects, the system information may indicate the random access resources of the respective IAB node. In some aspects, the system information may indicate the resource configuration (e.g., the time division duplexing configuration or the bandwidth part configuration) of the respective IAB node.

Illustrated at 814, the IAB node 804 may determine its initial random access configuration and/or the initial resources assigned for a random access procedure. In some aspects, the IAB node 804 may be preconfigured with a certain random access configuration and/or random access resources, and the IAB node 804 may determine that the preconfigured random access configuration and/or random access resources will be the initial random access configuration and/or random access resources. In some aspects, the IAB node 804 may be preconfigured with multiple random access configurations and random access resources, and the IAB node 804 may determine which of the preconfigured random access configurations and random access resources to use as the initial random access configuration and random access resources. For example, the IAB node 804 may be preconfigured with a regular random access configuration and random access resources and with a mobile random access configuration and mobile random access resources. The IAB node 804 may determine whether the IAB node 804 is mobile or stationary. If the IAB node 804 determines that it is mobile, it may determine the mobile random access configuration as the initial random access configuration and determine the mobile random access resources as the initial random access resources. If the IAB node 804 determines that it is not mobile, it may determine the regular random access configuration as the initial random access configuration and determine the regular random access resources as the initial random access resources. In some aspects, the IAB node 804 may determine its initial random access configuration and random access resources to optimize the random access procedure, as discussed supra with respect to 716 of FIG. 7.

In some aspects, the IAB node 804 may determine its initial random access configuration and/or its initial random access resources based on the system information 810 received from the IAB donor 802. In some aspects, the IAB node 804 may determine its initial random access configuration and/or its initial random access resources based on the system information 812 received from the IAB node 806. For example, the IAB node 804 may determine its initial random access configuration and/or its initial random access resources based on the random access configuration, the random access resources, and/or the resource configuration (e.g., the time division duplexing configuration or the bandwidth part configuration) of the IAB donor 802 or the IAB node 806.

In some aspects, the IAB node 804 may receive random access identifiers (e.g., random access message preambles) used by the IAB donor 802 and the IAB node 806 as part of the random access configuration information contained in the IAB donor 802 system information 810 and the IAB node 806 system information 812. The IAB node 804 may determine its random access identifier based on the received random access identifiers. For example, the IAB node 804 may select a random access identifier that is different from the received random access identifiers of the IAB donor 802 and the IAB node 806; or may have a preconfigured random access identifier, may determine that the preconfigured random access identifier conflicts with one of the received random access identifiers, and may select a new random access identifier which is different from the received random access identifiers.

In some aspects, the IAB node 804 may receive a subset of eligible random access identifiers as part of the random access configuration information contained in the IAB donor 802 system information 810 and/or the IAB node 806 system information 812. The random access identifier values may be partitioned into a first subset of values and a second subset of values. For example, the first subset of values may be for macro cells and the second subset of values may be for small cells, or the first subset of values may be for stationary cells and the second subset of values may be for mobile cells. The IAB node 804 may determine its subset of available random access identifiers based on the subset of eligible random access identifiers. In some aspects, the IAB node 804 may select the first subset or the second subset of random access identifier values based on a characteristic of the IAB node 804 (e.g., may select the first subset if the IAB node 804 is a small cell or a stationary cell, and may select the second subset if the IAB node 804 is a macro cell or a mobile cell). In some aspects, the IAB node 804 may determine that a preconfigured subset of random access identifier values is within the received subset of random access identifier values, may determine to use the preconfigured subset of random access identifier values if they are within the received subset of random access identifier values, and may select a new subset of random access identifier values if they are not within the received subset of random access identifier values.

In some aspects, the IAB node 804 may receive the random access resources being used at the IAB donor 802 in the system information 810 received from the IAB donor 802. The IAB node 804 may determine the random access resources for the IAB node 804 to be different from the random access resources of the IAB donor 802 (e.g., not overlapping in the time domain).

In some aspects, the IAB node 804 may receive the transmit power or the receive power of the IAB donor 802 and the IAB node 806 as part of the random access configuration information contained in the IAB donor 802 system information 810 and/or the IAB node 806 system information 812. The IAB node 804 may determine that interference with signals from the IAB donor 802 or the IAB node 806 may be possible (e.g., based on the transmit or receive power and the location of the IAB donor 802 or the IAB node 806) and may determine its transmit power or receive power to avoid interference with signals from the IAB donor 802 and/or the IAB node 806.

Once the IAB node 804 determines the initial configuration and/or random access resources, the IAB node 804 may transmit its initial configuration 816 to the IAB donor 802. The DU of the IAB node 804 may transmit the initial configuration 816 to the CU of the IAB donor 802 over the F1-AP interface during an initial setup procedure where the DU establishes its connection with the CU.

In some aspects, the IAB donor 802 may send a configuration update message 820 to the IAB node 804. The IAB node 804 may receive the configuration update message 820 and may change some or all of the random access configuration of the IAB node 804 based on the configuration update message 820. In some aspects, the IAB donor 802 may send the configuration update message 820 during the initial setup of the F1-AP interface.

As illustrated at 830, after the JAB node 804 has determined its initial random access configuration and initial random access resources at 814, the IAB node 804 may determine to reconfigure its random access configuration and/or random access resources. In some aspects, the IAB node 804 may determine to reconfigure its random access configuration and/or random access resources to optimize the load on the IAB node 804 or to optimize the resources utilization of the IAB node 804. In some aspects, the IAB node 804 may determine to reconfigure its random access configuration and/or random access resources based on a preconfigured parameter. For example, the preconfigured parameter may indicate whether the IAB node 804 is mobile or stationary. The IAB node 804 may reconfigure its random access configuration based on determining that the IAB node 804 has changed mobility states from being mobile to being stationary.

In some aspects, the IAB donor 802 may send a new random access configuration 832 to the IAB node 804, the IAB node 804 may receive the new random access configuration 832, and the IAB node 804 may determine to reconfigure its random access configuration and/or the resources assigned for the random access procedure at 830 based on receiving the new random access configuration 832, and may reconfigure its random access configuration to the new random access configuration 832. In some aspects, the new random access configuration 843 may be a recommended or optional random access configuration, and the IAB node 804 may determine whether or not to use the new random access configuration 832, or how to use the new random access configuration 832. For example, the new random access configuration 832 may include a subset of random access identifier values and the IAB node 804 may determine to reconfigure its random access identifier value to be within the subset of random access identifier values.

In some aspects, the IAB node 804 may determine, at 830, to reconfigure its random access configuration and/or the resources assigned for the random access procedure in response to receiving new or updated system information. In some aspects, the IAB node 806 may transmit updated system information 834 to the IAB node 804, the IAB node 804 may receive the new system information 834, and the IAB node may reconfigure its random access configuration based on the new system information 834.

In some aspects, a new IAB node 808 may send system information 836 to the IAB node 804. The new IAB node 808 may be a mobile IAB node. The IAB node 808 may not have sent system information before the IAB node 804 determined the initial random access configuration and the initial random access resources. For example, the IAB node 804 may have received system information from neighboring cells, and the IAB node 808 may initially have been too far geographically or too distant in IAB network tree to be considered a neighboring cell. The IAB node 808 may send the system information 836 to the IAB node 804 in response to determining that the IAB node 808 is within a set geographic range of the IAB node 804, determining that the IAB node 808 is a parent or child of the IAB node 804, or determining that the IAB node 808 and the IAB node 804 have a common parent or child node. The IAB node 804 may determine to reconfigure its random access configuration based on receiving the new system information 836 from the IAB node 808.

In some aspects, the IAB node 804 may determine to reconfigure its random access configuration and/or the resources assigned for the random access procedure at 830 based on evaluating the new system information 834 or 836 itself. In some aspects, the IAB node 804 may determine to reconfigure its random access configuration and/or the resources assigned for the random access procedure at 830 based on transmitting the new system information 834 or 836 to the IAB donor 802 and receiving a new random access configuration 832 from the IAB donor 802 in response to the new system information 834 or 836.

Various aspects of the new or updated system information 834 or 836 which the IAB node 804 may consider, at 830, in determining to reconfigure its random access configuration and how to reconfigure its random access configuration are discussed supra with respect to determining the initial random access configuration of the IAB node 804 based on the system information 810 and/or 812. For example, the IAB node 804 may determine to reconfigure its random access identifier based on received random access identifiers, may determine to reconfigure its subset of available random access identifiers based on the received subset(s) of eligible random access identifiers (e.g., to avoid overlapping random access identifiers), may determine to reconfigure its random access resources to be different from the received random access resources (e.g., not overlapping in the time domain), or may determine to reconfigure its transmit and/or receive power levels based on the received transmit and/or receive power levels of the neighbor IAB node and/or the location of the neighbor IAB node (e.g., to reduce or avoid conflicts with the neighbor IAB node).

Once the IAB node 804 determines the reconfigured random access configuration, the IAB node 804 may transmit a configuration update message 842 to the IAB donor 802, indicating the reconfigured random access reconfiguration of the IAB node 804.

The IAB node 804 may receive new or updated acquired system information 844 from neighboring cells. In some aspects, the acquired system information 844 may be from a neighboring cell which is in a different IAB network (hereinafter 'an out-of-network neighbor cell'). In some aspects, the IAB node 804 may determine to reconfigure its random access configuration as illustrated at 830 based on receiving the acquired system information 844 from the out-of-network neighbor cell. In some aspects, the IAB node 804 may transmit the acquired system information 844 of the out-of-network neighbor cell to the IAB donor 802. Based on the acquired system information 844, the CU of the IAB donor 802 may send new a random access configuration 832 to the IAB node 804 and the IAB node 804 may determine to reconfigure its random access configuration as illustrated at 830 based on receiving the new random access configuration 832, as discussed supra.

Figure 9:
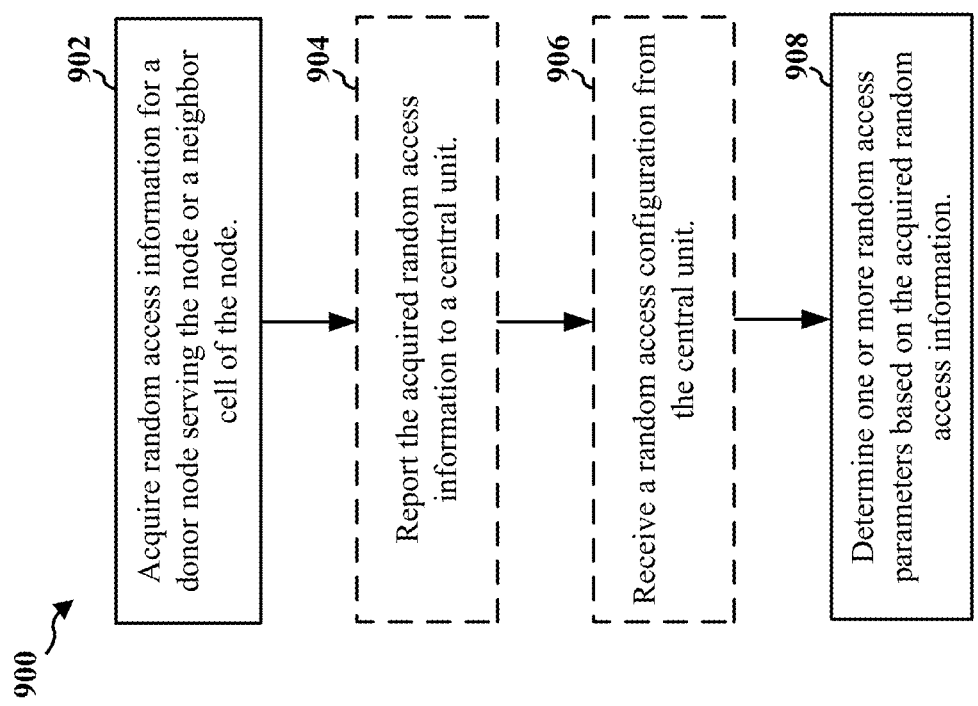
FIG. 9 is a flowchart of a method of wireless communication.

FIG. 9 is a flowchart 900 of a method of wireless communication. The method may be performed by an IAB node (e.g., the IAB node 103; the IAB node 804; the IAB node 1450; the apparatus 1002/1002'; the processing system 1114, which may include the memory 376 and which may be the IAB node 103, 804, or 1350 or a component of the IAB node 103, 804, or 1350 such as the TX processor 316, the RX processor 370, and/or the controller/processor 375). The method may enable an IAB node to improve or optimize random access parameters based on other IAB nodes in a network. In some examples, the method may enable the IAB node to optimize or select an improved initial random access configuration and/or random access resources.

At 902, at a mobile termination (MT) of the node, the node may acquire random access information for at least one of a donor node serving the node or a neighbor cell of the node. For example, 902 may be performed by the acquisition component 1012. In some aspects, the node may be an integrated access and backhaul node. In some aspects, the node may acquire the random access information in system information from the donor node or the neighbor cell. In some aspects, the acquired random access information may include at least one of a random access configuration for the donor node or the neighbor cell, random access resources for the donor node or the neighbor cell, a TDD resource configuration for the donor node or the neighbor cell, or a bandwidth part configuration for the donor node or the neighbor cell.

In some aspects, at 904, the node may report the acquired random access information from a DU of the node to a CU. For example, 904 may be performed by the report component 1014. In some aspects, the node may report the acquired random access information in an initial report to the CU. In some aspects, the node may report the acquired random access information in an update report to the CU.

In some aspects, at 906, the node may receive a random access configuration from the CU, wherein the node determines the one or more random access parameters based on the random access configuration received from the CU. For example, 906 may be performed by the configuration reception component 1008. In some aspects, the random access configuration from the CU may include a range of random access preamble identifiers. In some aspects, the random access information that the node reports to the CU may include information for the neighbor cell that belongs to a different CU.

Finally, at 908, the node may determine one or more random access parameters for a device to perform a random access procedure with the node, wherein the one or more random access parameters are based on the acquired random access information. For example, 908 may be performed by the parameter determination component 1006. In some aspects, the node may determine the one or more random access parameters using the acquired random access information. In some aspects, determining the one or more random access parameters may include selecting a first set of random access preamble identifiers that is different than a second set of random access preamble identifiers for the donor node or the neighbor cell. In some aspects, determining the one or more random access parameters may include selecting first random access resources that do not overlap in time with second random access resources for the donor node or the neighbor cell. In some aspects, determining the one or more random access parameters may include selecting a power control parameter for random access based on potential interference to the donor node or the neighbor cell. In some aspects, the one or more random access parameters determined by the node may include at least one of random access preamble identifiers, time and frequency resources, a power related parameter, a number of retransmissions, or a back-off timer for contention resolution. In some aspects, the node may determine the one or more random access parameters based on at least one of avoiding an overlap with other random access parameters of the donor node or the neighbor cell, increasing random access probability, reducing random access latency, reducing contention between the node and the donor node or the neighbor cell, or improving random access involving mobility.

Figure 10:
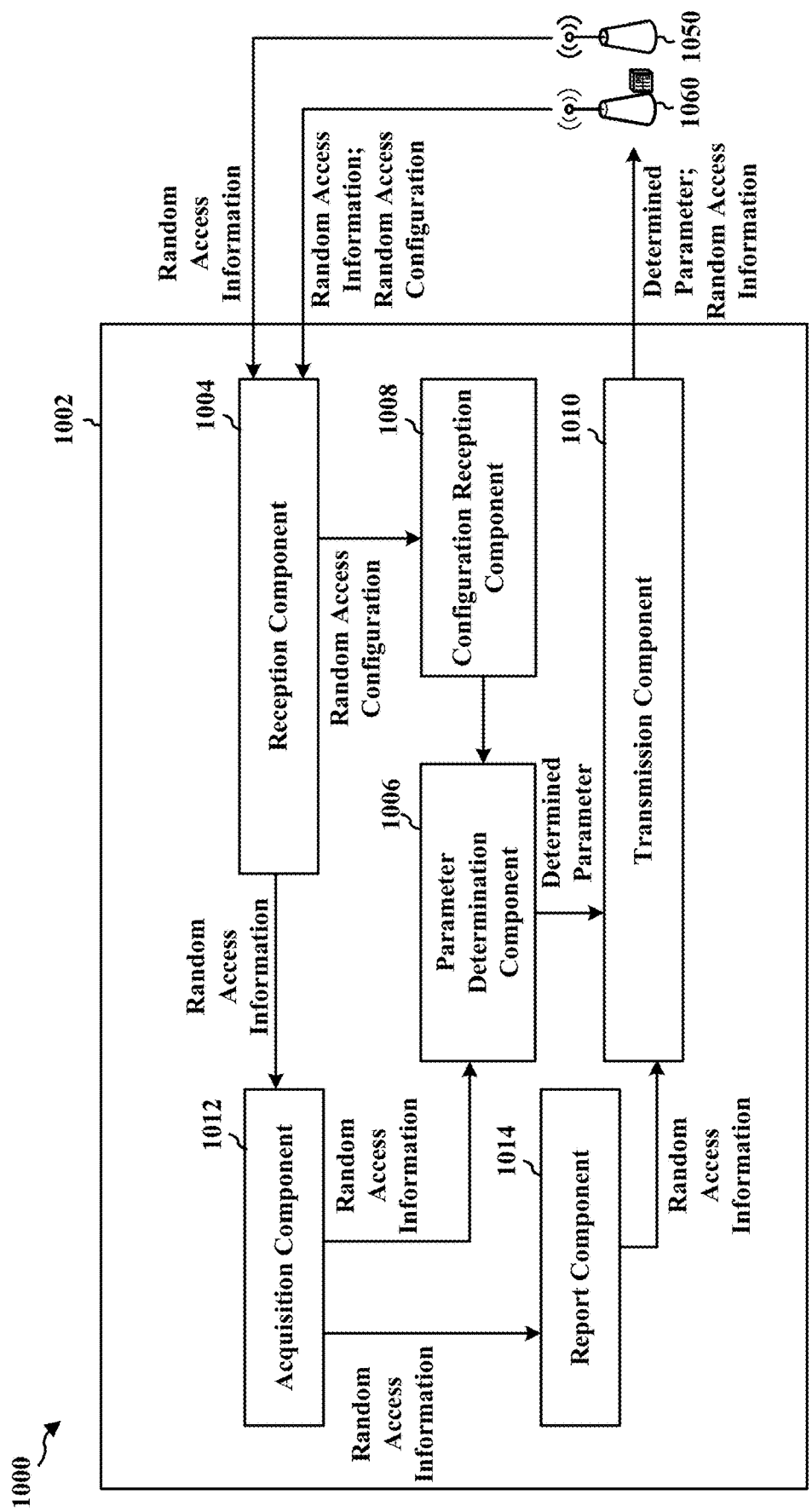
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a node, e.g., an IAB node. The apparatus includes a reception component 1004 that receives random access information and a random access configuration from a donor node 1060, and that receives random access information from a node 1050 (e.g., a neighbor node). The apparatus includes an acquisition component 1012 that receives the random access information from the reception component 1004, e.g., as described in connection with 902. The apparatus includes a report component 1014 that receives the random access information from the acquisition component 1012 and sends the random access information to the transmission component 1010 to report to a CU of the donor node 1060, e.g., as described in connection with 904. The apparatus includes a configuration reception component 1008 that receives the random access configuration from the reception component 1004 and sends the random access configuration to a parameter determination component 1006, e.g., as described in connection with 906. The apparatus includes the parameter determination component 1006 that determines a random access parameter for the node, e.g., as described in connection with 908, and sends the determined parameter to the transmission component 1010 to send to the donor node 1060. Finally, the apparatus includes the transmission component 1010 that sends the determined parameter and the random access information to the donor node 1060.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
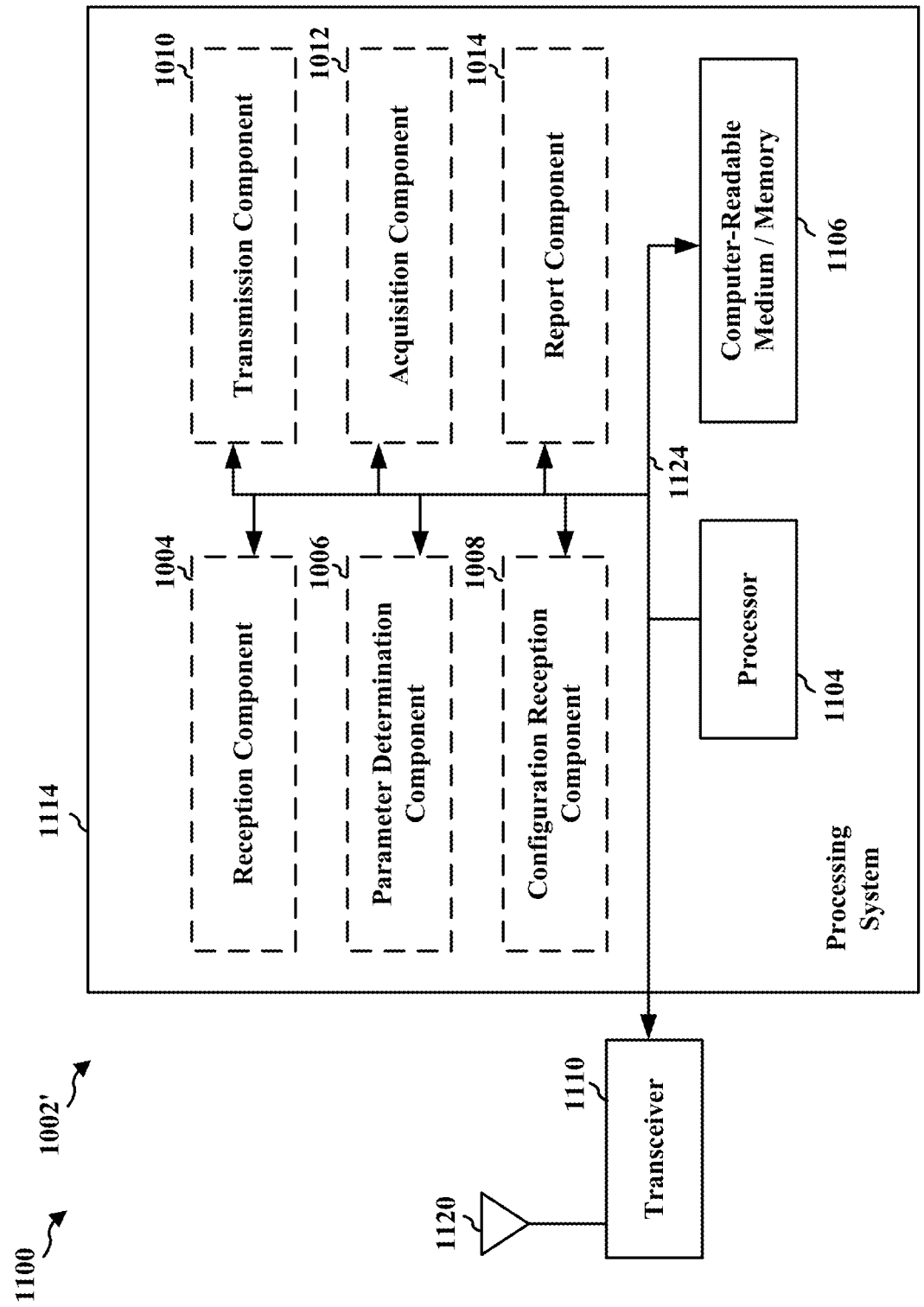
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, and 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for acquiring, at a mobile termination (MT) of the node, random access information for at least one of a donor node serving the node or a neighbor cell of the node and means for determining one or more random access parameters for a device to perform a random procedure with the node, wherein the one or more random access parameters are based on the acquired random access information. The apparatus may include means for reporting the acquired random access information from a DU of the node to a CU. The apparatus may include means for receiving a random access configuration from the CU, and the means for determining may determine the one or more random access parameters based on the random access configuration received from the CU. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
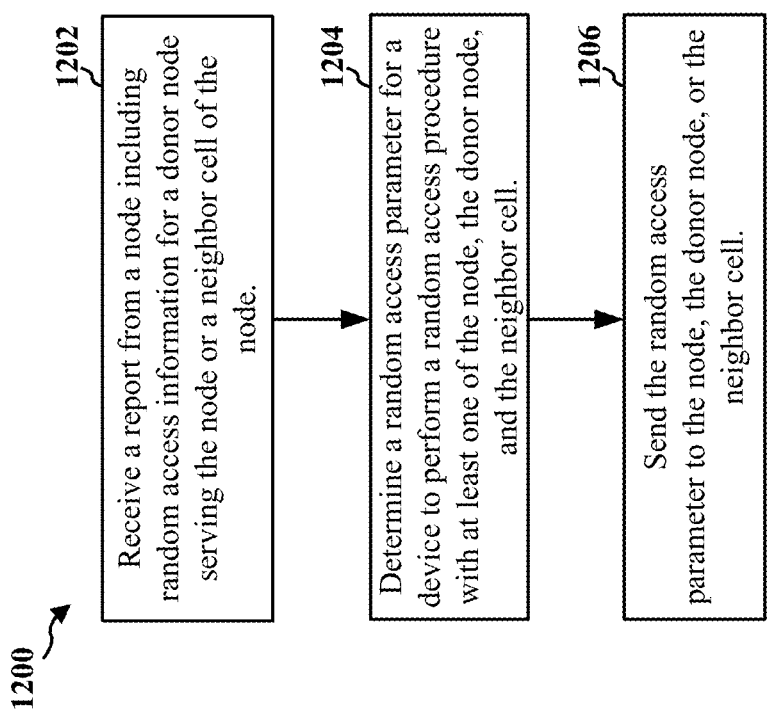
FIG. 12 is a flowchart of a method of wireless communication.

FIG. 12 is a flowchart 1200 of a method of wireless communication. The method may be performed by a control node. In some aspects, the method may be performed by a CU (e.g., the CU of the IAB donor 180a; the CU of the IAB donor 802; the CU of the IAB donor 1060; the apparatus 1302/1302'; the processing system 1414, which may include the memory 376 and which may be the entire IAB donor 180a, 802, or 1060, the entire CU of the IAB donor 180a, 802, or 1060 or a component of the CU or the IAB donor IAB donor 180a, 802, or 1060, such as the TX processor 316, the RX processor 370, and/or the controller/processor 375) and/or a processor of the control node or CU. The method may enable a CU to improve or optimize random access parameters of an IAB node connected to the CU based on other IAB nodes neighboring the IAB node. In some examples, the neighboring IAB nodes may be in the same network or may be in a different network.

At 1202, the CU may receive a report from a node served by the CU including random access information acquired by the node for at least one of a donor node serving the node or a neighbor cell of the node. For example, 1202 may be performed by the report component 1312. In some aspects, the node may include an integrated access and backhaul node. In some aspects, the report may include an initial report from the node. In some aspects, the report may include an update report from the node. In some aspects, the report from the node may include information for the neighbor cell that belongs to a different CU. In some aspects, the random access information may include at least one of a random access configuration for the donor node or the neighbor cell, random access resources for the donor node or the neighbor cell, a time division duplex (TDD) resource configuration for the donor node or the neighbor cell, or a bandwidth part configuration for the donor node or the neighbor cell.

At 1204, the CU may determine one or more random access parameters for a device to perform a random access procedure with at least one of the node, the donor node, and the neighbor cell, wherein the one or more random access parameters are determined based on the acquired random access information. For example, 1204 may be performed by the determination component 1314. In some aspects, the one or more random access parameters may include a range of random access preamble identifiers for the node. In some aspects, determining the one or more random access parameters may include selecting a first set of random access preamble identifiers that is different than a second set of random access preamble identifiers for the donor node or the neighbor cell. In some aspects, determining the one or more random access parameters may include selecting first random access resources that do not overlap in time with second random access resources for the donor node or the neighbor cell. In some aspects, determining the one or more random access parameters may include selecting a power control parameter for random access based on potential interference to the donor node or the neighbor cell. In some aspects, the one or more random access parameters determined by the CU may include at least one of random access preamble identifiers, time and frequency resources, a power related parameter, a number of retransmissions, or a back-off timer for contention resolution. In some aspects, the CU may determine the one or more random access parameters based on at least one of avoiding an overlap with other random access parameters of the donor node or the neighbor cell, increasing random access probability, reducing random access latency, reducing contention between the node and the donor node or the neighbor cell, or improving random access involving mobility.

Finally, at 1206 the CU may send the one or more random access parameters to the node. For example, 1206 may be performed by the transmission component 1310.

Figure 13:
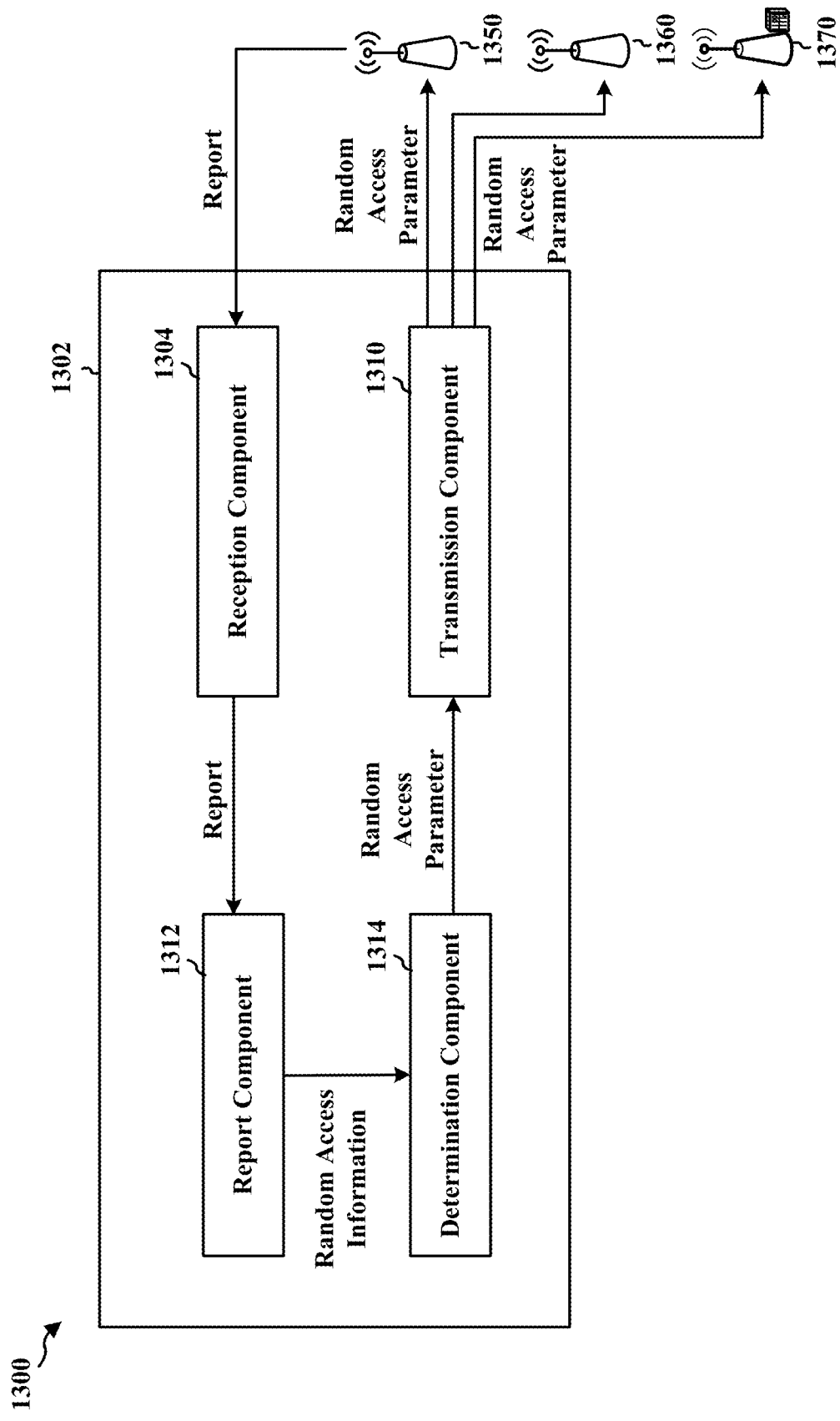
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a CU of an IAB donor. The apparatus includes a reception component 1304 that receives a report including random access information from a node 1350. The apparatus includes a report component 1312 that receives the report from the reception component 1304 and sends the random access information to a determination component 1314, e.g., as described in connection with 1202. The apparatus includes the determination component 1314 that receives the random access information from the report component 1312 and determines a random access parameter for a device to perform a random access procedure with at least one of the node 1350, the donor node 1370, and the neighbor cell 1360, e.g., as described in connection with 1204. The apparatus includes a transmission component 1310 that receives the random access parameter from the determination component 1314 and transmits the random access parameter to the node 1350, the donor node 1370, or the neighbor cell 1360.

The apparatus may include additional components that perform each of the blocks of the algorithm in the aforementioned flowcharts of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
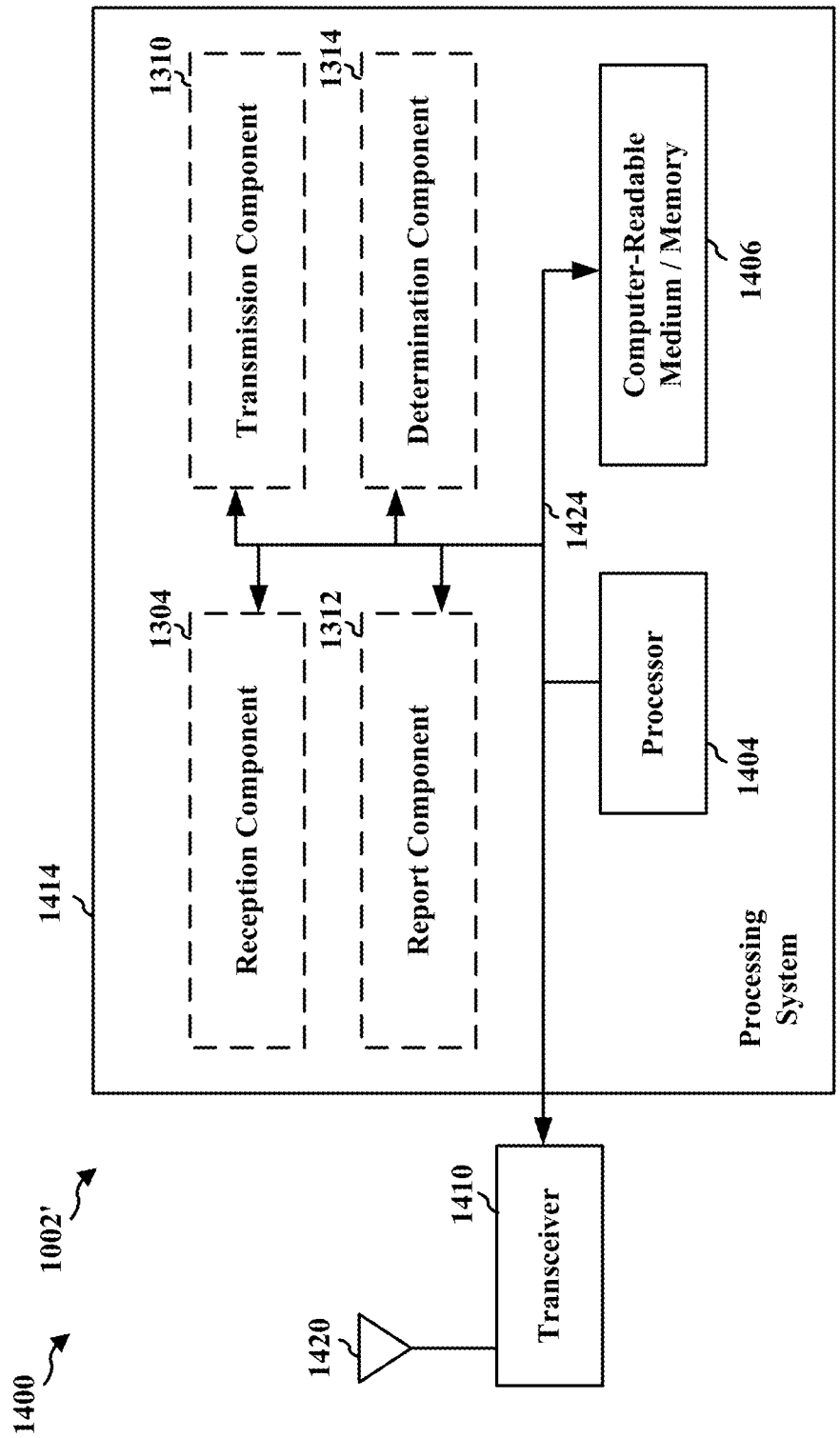
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1310, 1312, 1314, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1310, 1312, and 1314. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for receiving a report, from a node served by the CU, including random access information acquired by the node for at least one of a donor node serving the node or a neighbor cell of the node. The apparatus may include means for determining one or more random access parameters for a device to perform a random procedure with the node, where the one or more random access parameters are determined based on the acquired random access information. The apparatus may include means for sending the one or more random access parameters to the node. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a node, comprising:
   acquiring random access information for a donor node serving the node and a neighbor cell of the node, wherein the random access information for the donor node is acquired from the donor node and the random access information for the neighbor cell is acquired from the neighbor cell; and
   determining one or more random access parameters for a device to perform a random access procedure with the node, wherein the one or more random access parameters are based on the acquired random access information.

2. The method of claim 1, further comprising:
   reporting the acquired random access information from a distributed unit (DU) of the node to a first central unit (CU); and
   receiving a random access configuration from the first CU, wherein the node determines the one or more random access parameters based on the random access configuration received from the first CU.

3. The method of claim 2, wherein the acquired random access information that the node reports to the first CU comprises information for the neighbor cell that belongs to a second CU different than the first CU.

4. The method of claim 1, wherein the acquired random access information includes at least one of:
   a random access configuration for the donor node or the neighbor cell,
   random access resources for the donor node or the neighbor cell,
   a time division duplex (TDD) resource configuration for the donor node or the neighbor cell, or
   a bandwidth part configuration for the donor node or the neighbor cell.

5. An apparatus for wireless communication at a node, comprising:
   a memory; and
   at least one processor coupled to the memory and configured to:
      acquire random access information for a donor node serving the node and a neighbor cell of the node, wherein the random access information for the donor node is acquired from the donor node and the random access information for the neighbor cell is acquired from the neighbor cell; and
      determine one or more random access parameters for a device to perform a random access procedure with the node, wherein the one or more random access parameters are based on the acquired random access information.

6. The apparatus of claim 5, wherein the node comprises an integrated access and backhaul node.

7. The apparatus of claim 5, wherein the processor determines the one or more random access parameters using the acquired random access information.

8. The apparatus of claim 5, wherein the processor is further configured to:
   report the acquired random access information from a distributed unit (DU) of the node to a first central unit (CU); and
   receive a random access configuration from the first CU, wherein the processor determines the one or more random access parameters based on the random access configuration received from the first CU.

9. The apparatus of claim 8, wherein the processor reports the acquired random access information in an initial report to the first CU.

10. The apparatus of claim 8, wherein the processor reports the acquired random access information in an update report to the first CU.

11. The apparatus of claim 8, wherein the random access configuration from the first CU includes a range of random access preamble identifiers.

12. The apparatus of claim 8, wherein the acquired random access information that the processor reports to the first CU comprises information for the neighbor cell that belongs to a second CU different than the first CU.

13. The apparatus of claim 5, wherein the acquired random access information includes at least one of:
 a random access configuration for the donor node or the neighbor cell,
 random access resources for the donor node or the neighbor cell,
 a time division duplex (TDD) resource configuration for the donor node or the neighbor cell, or
 a bandwidth part configuration for the donor node or the neighbor cell.

14. The apparatus of claim 5, wherein determining the one or more random access parameters includes:
 selecting a first set of random access preamble identifiers that is different than a second set of random access preamble identifiers for the donor node or the neighbor cell.

15. The apparatus of claim 5, wherein determining the one or more random access parameters includes:
 selecting first random access resources that do not overlap in time with second random access resources for the donor node or the neighbor cell.

16. The apparatus of claim 5, wherein determining the one or more random access parameters includes:
 selecting a power control parameter for random access based on potential interference to the donor node or the neighbor cell.

17. The apparatus of claim 5, wherein the one or more random access parameters determined by the processor include at least one of:
 random access preamble identifiers,
 time and frequency resources,
 a power related parameter,
 a number of retransmissions, or
 a back-off timer for contention resolution.

18. The apparatus of claim 17, wherein the processor determines the one or more random access parameters based on at least one of:
 avoiding an overlap with other random access parameters of the donor node or the neighbor cell,
 increasing random access probability,
 reducing random access latency,
 reducing contention between the node and the donor node or the neighbor cell, or
 improving random access involving mobility.

19. The apparatus of claim 5, wherein the random access information is acquired at a mobile termination (MT) of the node.

20. An apparatus for wireless communication at a node, comprising:
 means for acquiring random access information for a donor node serving the node and a neighbor cell of the node, wherein the random access information for the donor node is acquired from the donor node and the random access information for the neighbor cell is acquired from the neighbor cell; and
 means for determining one or more random access parameters for a device to perform a random procedure with the node, wherein the one or more random access parameters are based on the acquired random access information.

21. The apparatus of claim 20, further comprising:
 means for reporting the acquired random access information from a distributed unit (DU) of the node to a first central unit (CU); and
 means for receiving a random access configuration from the first CU, wherein the node determines the one or more random access parameters based on the random access configuration received from the first CU.

22. The apparatus of claim 21, wherein the acquired random access information that the means for reporting reports to the first CU comprises information for the neighbor cell that belongs to a second CU different than the first CU.

23. The apparatus of claim 20, wherein the acquired random access information includes at least one of:
 a random access configuration for the donor node or the neighbor cell,
 random access resources for the donor node or the neighbor cell,
 a time division duplex (TDD) resource configuration for the donor node or the neighbor cell, or
 a bandwidth part configuration for the donor node or the neighbor cell.

24. A non-transitory computer-readable medium storing computer executable code for wireless communication at a node, the code when executed by a processor cause the processor to:
 acquire random access information for a donor node serving the node and a neighbor cell of the node, wherein the random access information for the donor node is acquired from the donor node and the random access information for the neighbor cell is acquired from the neighbor cell; and
 determine one or more random access parameters for a device to perform a random access procedure with the node, wherein the one or more random access parameters are based on the acquired random access information.

25. The computer-readable medium of claim 24, wherein the code further causes the processor to:
 report the acquired random access information from a distributed unit (DU) of the node to a first central unit (CU); and
 receive a random access configuration from the first CU, wherein the processor determines the one or more random access parameters based on the random access configuration received from the first CU.

26. The computer-readable medium of claim 25, wherein the acquired random access information that the code causes the processor to report to the first CU comprises information for the neighbor cell that belongs to a second CU different than the first CU.

27. The computer-readable medium of claim 24, wherein the code causes the processor to acquire the random access information in system information from the donor node or the neighbor cell.

28. The computer-readable medium of claim 27, wherein the acquired random access information includes at least one of:
 a random access configuration for the donor node or the neighbor cell,
 random access resources for the donor node or the neighbor cell,
 a time division duplex (TDD) resource configuration for the donor node or the neighbor cell, or
 a bandwidth part configuration for the donor node or the neighbor cell.

29. A method of wireless communication at a control node, comprising:
- receiving a report, from a node served by the control node, including random access information acquired by the node for a donor node serving the node and a neighbor cell of the node;
- determining one or more random access parameters for a device to perform a random access procedure with at least one of the node, the donor node, or the neighbor cell, wherein the one or more random access parameters are determined based on the acquired random access information; and
- sending the one or more random access parameters to the node, the donor node, or the neighbor cell.

30. The method of claim 29, wherein the control node is a first control node and wherein the report from the node comprises information for the neighbor cell that belongs to a second control node different than the first control node.

31. The method of claim 29, wherein the random access information includes at least one of:
- a random access configuration for the donor node or the neighbor cell,
- random access resources for the donor node or the neighbor cell,
- a time division duplex (TDD) resource configuration for the donor node or the neighbor cell, or
- a bandwidth part configuration for the donor node or the neighbor cell.

32. The method of claim 29, wherein the one or more random access parameters determined by the control node include at least one of:
- random access preamble identifiers,
- time and frequency resources,
- a power related parameter,
- a number of retransmissions, or
- a back-off timer for contention resolution.

33. The method of claim 32, wherein the control node determines the one or more random access parameters based on at least one of:
- avoiding an overlap with other random access parameters of the node, the donor node, or the neighbor cell,
- increasing random access probability,
- reducing random access latency,
- reducing contention between the node and the donor node or the neighbor cell, or
- improving random access involving mobility.

34. An apparatus for wireless communication at a control node, comprising:
- a memory; and
- at least one processor coupled to the memory and configured to:
  - receive a report, from a node served by the control node, including random access information acquired by the node for a donor node serving the node and a neighbor cell of the node;
  - determine one or more random access parameters for a device to perform a random access procedure with at least one of the node, the donor node, or the neighbor cell, wherein the one or more random access parameters are determined based on the acquired random access information; and
  - send the one or more random access parameters to the node, the donor node, or the neighbor cell.

35. The apparatus of claim 34, wherein the node comprises an integrated access and backhaul node.

36. The apparatus of claim 34, wherein the report comprises an initial report from the node.

37. The apparatus of claim 34, wherein the report comprises an update report from the node.

38. The apparatus of claim 34, wherein the one or more random access parameters include a range of random access preamble identifiers for the node, the donor node, or the neighbor cell.

39. The apparatus of claim 34, wherein the control node is a first control node and wherein the report from the node comprises information for the neighbor cell that belongs to a second control node different than the first control node.

40. The apparatus of claim 34, wherein the random access information includes at least one of:
- a random access configuration for the donor node or the neighbor cell,
- random access resources for the donor node or the neighbor cell,
- a time division duplex (TDD) resource configuration for the donor node or the neighbor cell, or
- a bandwidth part configuration for the donor node or the neighbor cell.

41. The apparatus of claim 34, wherein the processor determining the one or more random access parameters includes:
- selecting a first set of random access preamble identifiers for the node that is different than a second set of random access preamble identifiers for the donor node or the neighbor cell.

42. The apparatus of claim 34, wherein the processor determining the one or more random access parameters includes:
- selecting first random access resources for the node that do not overlap in time with second random access resources for the donor node or the neighbor cell.

43. The apparatus of claim 34, wherein the processor determining the one or more random access parameters includes:
- selecting a power control parameter for random access based on potential interference between the node and the donor node or the neighbor cell.

44. The apparatus of claim 34, wherein the one or more random access parameters determined by the processor include at least one of:
- random access preamble identifiers,
- time and frequency resources,
- a power related parameter,
- a number of retransmissions, or
- a back-off timer for contention resolution.

45. The apparatus of claim 44, wherein the processor determines the one or more random access parameters based on at least one of:
- avoiding an overlap with other random access parameters of the node, the donor node, or the neighbor cell,
- increasing random access probability,
- reducing random access latency,
- reducing contention between the node and the donor node or the neighbor cell, or
- improving random access involving mobility.

46. The apparatus of claim 34, wherein the control node comprises a central unit (CU) of an IAB donor.

47. An apparatus for wireless communication at a control node, comprising:
- means for receiving a report, from a node served by the control node, including random access information acquired by the node for a donor node serving the node and a neighbor cell of the node;
- means for determining one or more random access parameters for a device to perform a random access procedure with at least one of the node, the donor node, or the neighbor cell, wherein the one or more random access parameters are determined based on the acquired random access information; and means for sending the one or more random access parameters to the node, the donor node, or the neighbor cell.

48. The apparatus of claim 47, wherein the control node is a first control node and wherein the report from the node comprises information for the neighbor cell that belongs to a second control node different than the first control node.

49. The apparatus of claim 47, wherein the random access information includes at least one of:
   a random access configuration for the donor node or the neighbor cell,
   random access resources for the donor node or the neighbor cell,
   a time division duplex (TDD) resource configuration for the donor node or the neighbor cell, or
   a bandwidth part configuration for the donor node or the neighbor cell.

50. The apparatus of claim 47, wherein the one or more random access parameters determined by the means for determining include at least one of:
   random access preamble identifiers,
   time and frequency resources,
   a power related parameter,
   a number of retransmissions, or
   a back-off timer for contention resolution.

51. The apparatus of claim 50, wherein the means for determining determines the one or more random access parameters based on at least one of:
   avoiding an overlap with other random access parameters of the node, the donor node, or the neighbor cell,
   increasing random access probability,
   reducing random access latency,
   reducing contention between the node and the donor node or the neighbor cell, or
   improving random access involving mobility.

52. A non-transitory computer-readable medium storing computer executable code for wireless communication at a control node, the code when executed by a processor cause the processor to: receive a report, from a node served by the control node, including random access information acquired by the node for a donor node serving the node and a neighbor cell of the node; determine one or more random access parameters for a device to perform a random access procedure with at least one of the node, the donor node, or the neighbor cell, wherein the one or more random access parameters are determined based on the acquired random access information; and send the one or more random access parameters to the node, the donor node, or the neighbor cell.

53. The computer-readable medium of claim 52, wherein the control node is a first control node and wherein the report from the node comprises information for the neighbor cell that belongs to a second control node different than the first control node.

54. The computer-readable medium of claim 52, wherein the random access information includes at least one of:
   a random access configuration for the donor node or the neighbor cell,
   random access resources for the donor node or the neighbor cell,
   a time division duplex (TDD) resource configuration for the donor node or the neighbor cell, or
   a bandwidth part configuration for the donor node or the neighbor cell.

55. The computer-readable medium of claim 52, wherein the one or more random access parameters determined by the processor include at least one of:
   random access preamble identifiers,
   time and frequency resources,
   a power related parameter,
   a number of retransmissions, or
   a back-off timer for contention resolution.

56. The computer-readable medium of claim 55, wherein the code causes the processor to determine the one or more random access parameters based on at least one of:
   avoiding an overlap with other random access parameters of the node, the donor node, or the neighbor cell,
   increasing random access probability,
   reducing random access latency,
   reducing contention between the node and the donor node or the neighbor cell, or improving random access involving mobility.

* * * * *